United States Patent [19]

Sullivan

[11] 4,034,432

[45] July 12, 1977

[54] SPECTACLE CLEANING APPARATUS

[76] Inventor: James M. Sullivan, 1424 Sampson, Butte, Mont. 59701

[21] Appl. No.: 693,935

[22] Filed: June 8, 1976

[51] Int. Cl.² .................................. A46B 13/02
[52] U.S. Cl. ............................................. 15/21 C
[58] Field of Search .............. 15/21 R, 21 C, 21 D, 15/97 R

[56] References Cited

U.S. PATENT DOCUMENTS

| 3,008,161 | 11/1961 | Jensen | 15/21 D |
| 3,102,294 | 9/1963 | Miller et al. | 15/97 R |
| 3,464,080 | 9/1969 | Certo | 15/21 D X |

Primary Examiner—Edward L. Roberts

Attorney, Agent, or Firm—David A. Veeder; Arthur L. Urban

[57] ABSTRACT

Spectacle cleaning apparatus including resilient nose piece supporting means, two pairs of cooperating opposed rotatable brushing means located on either side of said nose piece supporting means, positioning means for changing the spacing between respective brushing means of each pair, drive means for rotating each brushing means, connecting means operatively connecting said drive means with said resilient nose piece supporting means to continuously change the position of said supporting means as said brushing means are rotated, and holding means to maintain the nose piece of spectacles against said supporting means as the position of said supporting means changes.

10 Claims, 2 Drawing Figures

SPECTACLE CLEANING APPARATUS

The present invention relates to apparatus for cleaning spectacles and, more particularly, relates to apparatus for automatically and simultaneously cleaning all lens faces of a pair of spectacles.

Spectacles, or eye glasses, are commonly cleaned by hand using a soft cloth or tissue. This cleaning method has not only been used by individual spectacle owners, but also by persons who clean a large number of spectacles, such as optometrists and other dispensers of spectacles. Hand cleaning is cumbersome because it requires the use of both hands, one to hold the spectacles and the other to move the cleaning cloth or tissue over the faces of one lens at a time. Also, it is necessary that the hands be clean to avoid contamination of the lens and the cleaning cloth.

Various types of powered cleaning apparatus have been proposed for an individual lens and other articles such as pens, false teeth, phonograph records and the like. For example, U.S. Pat. Nos. 789,616; 3,102,294; 3,150,401; and 3,774,256. However, one of these designs can be used successfully in the cleaning of spectacles automatically in a single operation.

An object of the present invention is to provide an automatic spectacle cleaning apparatus.

Another object of the present invention is to provide apparatus capable of cleaning all lens faces of a pair of spectacles in a single operation.

A further object of the invention is to provide apparatus for uniformly cleaning spectacles simply and conveniently.

Other objects and advantages of the invention will be apparent from the following detailed description of the accompanying drawing in which.

Figure 1:
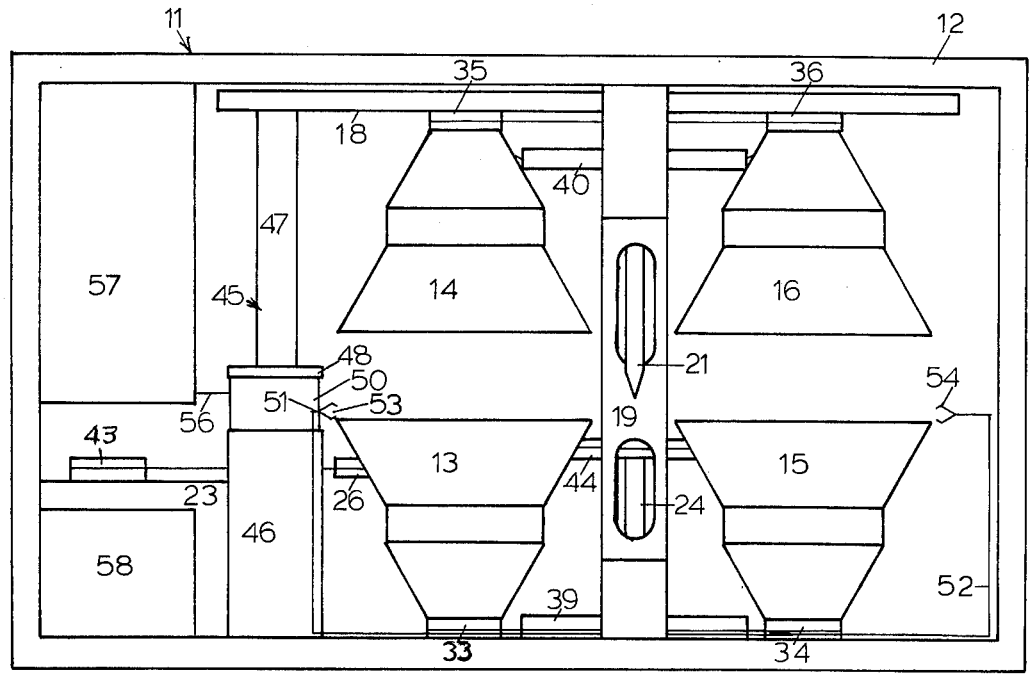
FIG. 1 is a top view of one embodiment of the spectacle cleaning apparatus of the invention.
Figure 2:
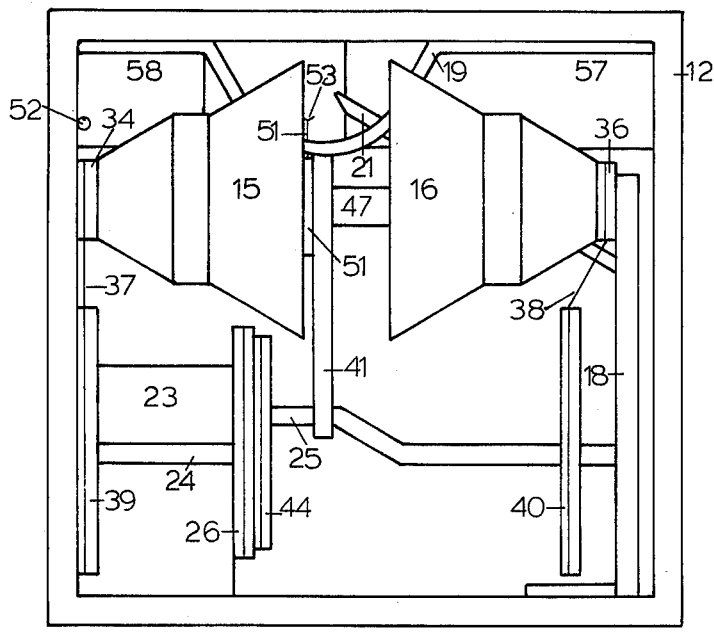
FIG. 2 is a right side view of the apparatus shown in FIG. 1.

As shown in the drawings, spectacle cleaning apparatus 11 includes a housing 12, having disposed therein rotatable brushing means shown in the drawings as brushes 13, 14, 15, 16 with each pair positioned in a cooperating opposed relationship with their surfaces facing each other. Brushes 13 and 15 are rotatably mounted on shafts extending inwardly from housing 12. Brushes 14 and 16 are rotatably mounted on shafts extending from a movable support member 18 (FIG. 2) which preferably is pivotally connected to housing 12.

A resilient nose piece support such as elastic strap 19, is disposed between the pairs of brushes 13, 14 and 15, 16. Strap 19 has an opening through which projects one end of holding rod 21. The opposite end of holding rod 21 is secured to support member 18.

Brushes 13, 14, 15, and 16 are driven by motor 23 through drive shaft 24 and a suitable arrangement of chains and gears and/or belts and pulleys. Each of the brushes has an appropriate pulley portion 33, 34, 35, and 36 about which are positioned belts 37 and 38 driven by pulleys 39 and 40, respectively, fixed to drive shaft 24. Drive shaft 24 is driven by motor 23 through transmission 26, chain 42 and gear 43 on the output of motor 23 and gear 44 on drive shaft 24. Rod 41 connects strap 19 with a camming portion 25 of drive shaft 24.

Movement of brushes 14 and 16 rotatably mounted on shafts extending from member 18 is effected by a solenoid 45, one end of which is fastened to support member 18. The solenoid 45 has a body portion 46 and movable rod 47 with a collar 48 secured thereto.

A resilient chamber 50 is positioned between the collar 48 and the body portion 46. Tubes 51 and 52 lead from chamber 50 to nozzles 53 and 54 positioned adjacent the spaces between each pair of brushes 13, 14 and 15, 16. Tube 56 leads from chamber 50 to reservoir 57.

Motor 23 and solenoid 45 are connected by suitable electrical wiring (not shown) to appropriate controls 58, which may include one or more timers and switches, if desired.

In the operation of the spectacle cleaning apparatus 11 shown in the drawings, spectacles are inserted through an appropriate opening in the top of housing 12 with the nose piece resting on support strap 19. Depressing a switch of controls 58 causes solenoid rod 47 to move within body portion 46. This movement causes collar 48 to compress chamber 50 against body portion 46 forcing liquid through tubes 51, 52 and out nozzles 53, 54 and against the faces of the spectacle lens.

Simultaneously, solenoid rod 47 moves support member 18, attached thereto, and brushes 14 and 16 rotatably mounted in the support member toward brushes 13 and 15 respectively and into an operating position with all four brushes in contact with the lens surfaces. Motor 23 is then started, causing power to be transferred through transmission 26, chain 42 and gears 43 and 44 to drive shaft 24. Rotation of drive shaft 24 in turn causes drive pulleys 39 and 40, secured thereto, to drive brushes 13 and 14, 15 and 16 through belts 37 and 38. Also, as drive shaft rotates, rod 41, connected to camming portion 25 of the drive shaft, moves up and down, causing strap 19 to move with it. Since strap 19 holds the nose piece of the spectacles, the spectacles move up and down slightly with respect to the brushes to facilitate cleaning of the lens. The end of rod 21 holds the spectacles in place against the strap 19.

After a predetermined interval, the controls 58 stop the motor 23 which stops the rotation of the brushes 13, 14, 15, and 16. Then solenoid rod 47 returns to its original position which moves support member 18 and brushes 14 and 16 attached thereto to move away from brushes 13 and 15. Also, pressure on chamber 50 is released, which allows liquid to flow into the chamber from reservoir 57 through tube 56.

The rotation speed of the brushes may be varied to provide maximum cleaning in a minimum period of time. Also, the brushes may be of various types, including bristle brushes, pad surfaces and the like. Advantageously, the brushing surfaces may be mounted on a resilient support to compensate for irregularities on lens surfaces. Any suitable liquid may be employed with volatile liquids being preferred since they will evaporate from the lens surfaces more quickly.

The above description and drawings show that the present invention provides a novel spectacle cleaning apparatus which cleans all of the spectacle lens faces simultaneously and automatically.

It will be apparent that various modifications in the specific embodiment described in detail and shown in the drawings may be made within the scope of the invention. For example, the location and arrangement of the different components may be changed. Therefore, the invention is to be limited only by the following claims:

What is claimed is:

1. Spectacle cleaning apparatus including resilient nose piece supporting means, the two pairs of cooperating opposed rotatable brushing means located on either side of said nose piece supporting means, positioning means for changing the spacing between respective brushing means of each pair, drive means for rotating each brushing means, connecting means operatively connecting said drive means with said resilient nose piece supporting means to continously change the position of said supporting means as said brushing means are rotated, and holding means to maintain the nose piece of spectacles against said supporting means as the position of said supporting means changes.

2. Spectacle cleaning apparatus according to claim 1 wherein said positioning means includes a movable support member for one of each pair of brushing means.

3. Spectacle cleaning apparatus according to claim 1 wherein said connecting means includes rod means, one end of which is connected to said nose piece supporting means and the other end of which is operatively connected to a camming portion of a drive shaft of said drive means.

4. Spectacle cleaning apparatus according to claim 2 wherein said positioning means includes a solenoid for moving said movable brushing means support member.

5. Spectacle cleaning apparatus according to claim 2 wherein said holding means is a rod extending from said movable broushing means support member to said nose piece supporting means.

6. Spectacle cleaning apparatus according to claim 1 wherein said nose piece supporting means is an elastic strap.

7. Spectacle cleaning apparatus according to claim 1 including liquid delivery means for applying a liquid into the spacing between each pair of brushing means.

8. Spectacle cleaning apparatus according to claim 1 wherein said drive means includes a motor, a drive shaft, and a belt and pulley arrangement operatively connecting said brushing means to said motor.

9. Spectacle cleaning apparatus according to claim 1 wherein said positioning means includes a common movable support member for one of each pair of brushing means and includes a solenoid for moving said support member; wherein said nose piece supporting means is an elastic strap having an opening therein, said holding means being in the form of a holding rod, one end of said holding rod extending from said brushing means support member and extending through said opening; wherein said drive means includes a motor, a timer control for said motor, a drive shaft, and a belt pulley arrangement operatively connecting said brushing means to said motor; said connecting means including a camming portion on said drive shaft, and means operatively connecting said camming portion to said nose piece supporting means.

10. Spectacle cleaning apparatus according to claim 9 including liquid delivery means actuatable by said solenoid for applying a liquid into the spacing between each pair of brushing means.

* * * * *